Feb. 6, 1951  D. L. SNOW ET AL  2,540,142

HIGH-FREQUENCY TUBE STRUCTURE AND SYSTEM

Filed Oct. 17, 1942  4 Sheets-Sheet 1

INVENTORS:
D. L. SNOW; S. F. VARIAN;
C. DODD; L. R. HILDEBRAND

BY Paul B. Hunter
ATTORNEY

INVENTORS:
D. L. SNOW; S. F. VARIAN;
C. DODD; L. R. HILDEBRAND
BY Paul B. Hunter
ATTORNEY

INVENTORS:
D. L. SNOW; S. F. VARIAN;
C. DODD; L. R. HILDEBRAND
BY
ATTORNEY

Patented Feb. 6, 1951

2,540,142

UNITED STATES PATENT OFFICE

2,540,142

HIGH-FREQUENCY TUBE STRUCTURE AND SYSTEM

Donald L. Snow, Hempstead, Sigurd F. Varian, Garden City, and Coleman Dodd and Lynn R. Hildebrand, Hempstead, N. Y., assignors to The Sperry Corporation, a corporation of Delaware Application October 17, 1942, Serial No. 462,436

34 Claims. (Cl. 250—27.5)

This invention relates, generally, to ultra high frequency generation devices, and, more particularly, to electron beam velocity modulation vacuum tubes which utilize reflex action and which operate at wavelengths of the order of ten centimeters or less.

Prior devices of the reflex type have utilized mechanical or thermal tuning devices exterior to the vacuum chamber of the tube itself and have required complex mechanical arrangements to assure that the elements of the tube have moved in parallel alignment to each other during tuning of the chamber to a desired resonant frequency. Further, exterior tuning devices have, by nature, been large in comparison to the size of such tubes operating at the shorter wavelengths, and have been readily adaptable to manual control only or have required the use of considerable power if operated by automatic control.

Further, the resonator walls themselves have been used to form a portion of the vacuum envelope of the tube, necessitating the use of considerable care and skill in fabrication of the tube in order to prevent leakage of air into the tube through flaws in soldered joints. Elements of the tube, such as the cathode and reflector, which require voltages considerably negative with respect to the grounded resonator grids, were supported from and insulated from the resonator itself by means of glass end bells which simultaneously formed a portion of the exterior vacuum envelope. Such construction is of necessity fragile, and requires the usual skill associated with the manufacture of glass-to-metal seals so that the device is not readily adaptable to production machine manufacture.

It is, therefore, a principal object of the present invention to provide an electron beam velocity modulating tube, specifically of the reflex type, of simple, compact construction allowing machine production, in which the entire ultra high frequency device is contained inside of a metallic vacuum envelope.

An object lies in the provision of a velocity modulation tube in which a simple electro-mechanically operated tuning element operates to insure parallel alignment and relative motion of the resonator entrance and exit grids.

A further object of the invention lies in the provision of such a tube in which all of the potential leads, including the ultra high frequency energy-removing coaxial line, pass through a single slightly modified conventional vacuum tube base.

Yet another object is to provide parallel-arm supporting means as a part of the interior of such a tube to provide positive alignment of the tube components during manufacture and thereafter.

An object is to provide means for fabrication of a glass-to-metal seal at any desired distance from an end of the outer conductor of a coaxial line.

A further object lies in the provision of combined electrical and thermal tuning means for the control of the output frequency of such tubes.

Additional objects of the invention are: to provide a single element electro-mechanical tuner located on a median line extending perpendicularly from the grids or other frequency-controlling electrodes; to provide means for overcoming frequency drift caused by thermal expansion of the tuner supporting means; and to provide improved apparatus for and a method of initially setting the frequency of a cavity resonator.

Other objects and advantages will become apparent from the specification, taken in connection with the accompanying drawings wherein the invention is embodied in concrete form.

In the drawings,

Fig. 1A is a fragmentary view partly in section, illustrating an optional connection between the tuning strut and resonator wall.

Similar characters of reference are used in all of the above figures to indicate corresponding parts.

Figure 1:
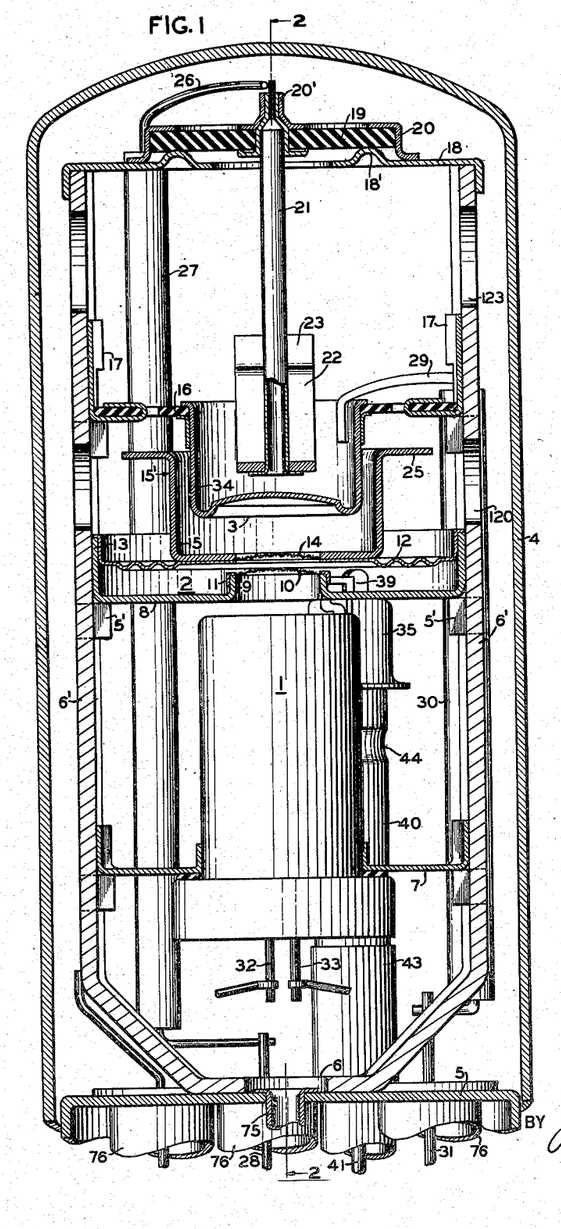
Fig. 1 is a partial cross-section view of one form of the present invention.

Referring to Fig. 1, it is seen that the electron beam velocity modulating device of the present invention consists of an electron gun or cathode-accelerator assembly 1, which projects a beam of electrons through a cavity resonator 2 toward a reflector 3 from whence the electrons are reflected back into the resonator 2. The structure is shown mounted on a base 5 within a vacuum-tight receptacle 4 of the conventional metal tube type. The base 5 is provided with symmetrically spaced Kovar tubes 76 which contain glass-to-metal seals (not shown) through which various voltage input or terminal leads pass. A tube 75 extends axially outward through the base 5 and is used to exhaust and seal-off the device in the conventional manner. Spot welded centrally onto the inner surface of the base 5 is the cross bar of a yoke or other supporting means 6 having generally parallel arms 6', preferably of channel (for example, arcuate) cross-section. The electron gun 1 is supported symmetrically between the arms of the yoke 6 by flanged support members 7. The inner and outer flanges of member 7 preferably are arcuate for spot welding to the outer diameter of the electron gun 1 and to the inner diameter of the arms 6' of the yoke 6.

Figure 5:
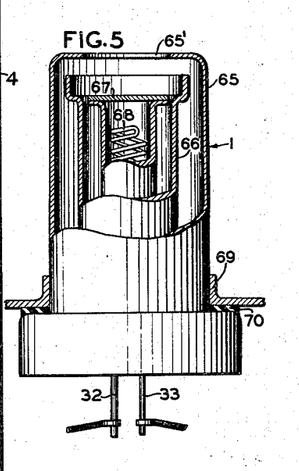
Fig. 5 is a partial cross-section view of a detail of Figs. 1 and 2.

The electron gun 1, shown more clearly in Fig. 5, is of conventional type, and comprises an outer cylindrical shell 65, apertured at 65' on its upper flat surface for passage of the electron beam.

The shell 65, which is electrically and thermally insulated in the well-known manner from the interior structure of the cathode, encloses an inner cylindrical collimating means such as a focusing shield 66, and an emitting cylinder 67 containing a non-inductively wound heater coil 68.

Positioned at a suitable distance above the electron gun 1 is a resonator 2, the rigid wall portion 8 adjacent to electron gun 1 of the resonator 2 having an outer diameter equal to the inner diameter of the arms 6' of the yoke 6 so that it may be spot welded therein. Wall 8, which may be of gold, silver, or copper-plated sheet steel or nickel, contains an outer annular flange 13 and a centrally located apertured reentrant portion 9. The portion 9 extends into the resonator 2 in alignment with the electron beam to provide a passageway therefor, and supports a frequency-controlling electrode such as an entrance grid 10 extending across the passageway. Grid 10 may be a fine wire mesh screen of gold or copper plated tungsten, for example, of 0.001 inch diameter wire, and may be held in position by an annular ring 11 spot welded to the outer diameter of the reentrant portion 9, and is bowed into the resonator by an amount sufficient to make its distortion due to heating by the electron beam insignificant.

A dished diaphragm 12 nests within the flange 13 and forms the boundary of the resonator opposite wall 8. Diaphragm 12, which may be of beryllium-copper, is made flexible at least about an outer annular region, and may be nickel plated so as to spot weld easily to the upwardly extending flange 13 of the resonator wall 8. Diaphragm 12 preferably is centrally apertured in the path of the beam to receive a second frequency-controlling electrode, such as an exit grid 14 which is preferably similar in construction to entrance grid 10. Mounted above exit grid 14 in the path of the electron beam is a concave reflector plate 3 of sheet steel or nickel, forming the bottom of a thimble or cup 34 which is clamped at its top to a circular insulating disc or plate 16 of mica or other low-loss material. The disc 16 is held in position by arcuately flanged clamps 17 which are spot welded to the inner diameter of the arms 6' of yoke 6 in the position shown in Fig. 1. The curvature of the concave portion of reflector 3 is made substantially equal to and of the same sign as that of the grids 10 and 14, in order that electrons traversing the grids 10 and 14 near the outer boundary of the beam will be subjected to substantially the same fields and will be required to travel the same distance therein as electrons traveling through these regions near the center or in other parts of the beam.

As is well known, the usual procedure in varying the resonant frequency of resonator 2 is to distort the walls of the resonator 2 mechanically so that the distance between grids 10 and 14 is changed. In prior devices, this was accomplished by thermal, electrical, or mechanical tuning means positioned exterior to the vacuum envelope of the device. In the present invention, electro-mechanical tuning means, about to be described, are located inside of the vacuum shell, preferably in such a manner as to cause the grids 10 and 14 or similar electrodes to maintain parallel alignment and uniform spacing during relative motion.

To the top ends of the arms 6' of the yoke 6 is spot welded an annular top plate 18 above which is centrally positioned an apertured insulating disc 19 clamped against rim 18' of plate 18 by means of an annular flanged ring 20 which, in turn, is spot welded to the top of disc 18. In a grommet 20', held within the centrally located aperture in insulating disc 19 is clamped a thermally expansible tuning strut such as a thin walled stainless steel tube 21, extending downwardly to well inside of the cup 34, so that it nearly touches the back of reflector 3. Thus by making the strut 21 relatively long, appreciable shift in the position of its lower end may be obtained over the range of operating temperatures. The strut is located so that at least the motion-imparting lower end thereof is located on and extends along the beam axis, or at least along a medium extending perpendicularly to the frequency-controlling electrodes of the resonator, whereby the electrodes remain in substantially parallel planes during their motion toward and away from one another. The strut 21 thereby may serve as a tuning element.

Figure 2:
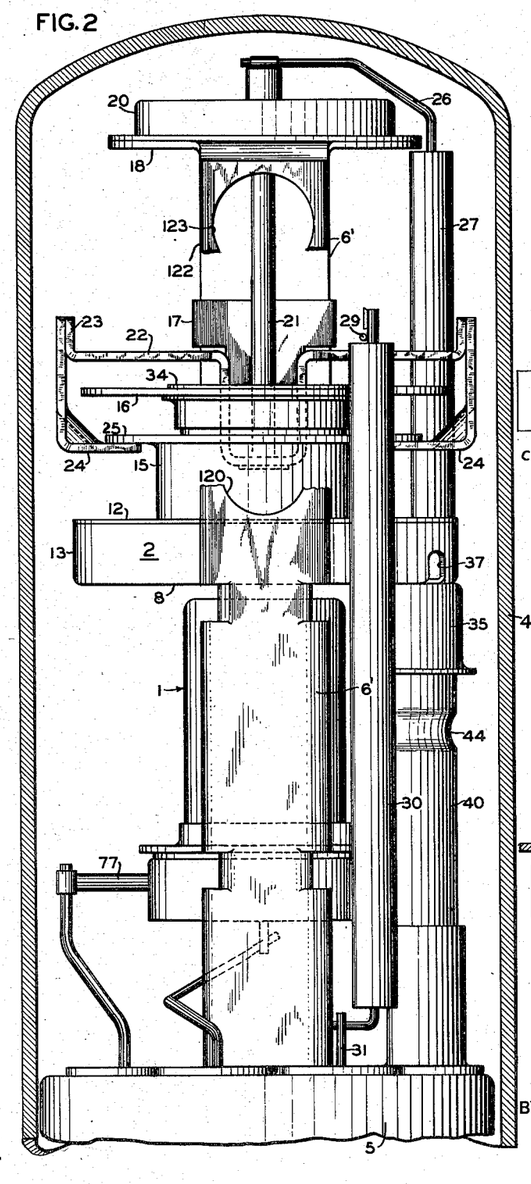
Fig. 2 is a partial cross-section view taken generally along the line 2—2 of Fig. 1, with parts in elevation.

A pressure-distributing arrangement extends from the free end of the strut 21 to the inner portion of diaphragm 12 to impart the tuning motion to the resonator grid 14. As seen more clearly in Fig. 2, a bracket 22 is fastened to the end of tube 21 adjacent to reflector 3. Bracket 22 extends upwardly and outwardly so as to provide clearance space between it and the interior of cup 34. Bracket 22 has upwardly extending flanges 23 at its outer ends to which are spot welded downwardly extending angular members 24. Centrally spot welded on the upper portion of flexible diaphragm 12 is a flanged apertured cup or tubule 15. The lower inwardly extending portions of angular members 24 are spot welded on opposite sides of the flange 25 of tubule 15, as shown in Fig. 2. If desired, brackets 22 and members 24 may be reversed as illustrated at 22' and 24' in Figure 1A for projection through the insulation disc 16, rather than around the disc as shown in Fig. 2. thereby radially shortening members 22 and minimizing vibrational effects. Elements 22 and 24 and other similar elements may be made of metals having different thermal coefficients of expansion arranged to substantially compensate for ambient temperature drift introduced by the expansion of such members as arms 6'. Resonator 2 has been made of unusual shape, being of large diameter relative to its axial thickness, and reflector cup 34 and bracket 22 have been designed with the view in mind of making the tube assembly as compact as possible.

To the upper insulated end of tubular strut 21 is spot welded a lead wire 26, which travels downwardly through the length of the tube in an insulating ceramic sleeve 27 for connection with terminal 28 which extends to a tube base pin (not shown) for connection with a source of power. Current thus may be caused to flow from terminal 28, through lead 26, and through the thin walled tubular strut 21, a return path for the current being provided by bracket 22, members 24, tubule 15, diaphragm 12 and arms 6' through the base 5 of the tube. Thus, by controlling the current passing through the tube 21, its length, and consequently the distance between grids 10 and 14, may be controlled. The rapidity of response of the thermal tuning device may be increased by using a strut 21 of reduced cross-section, for example, a tube of smaller diameter and thickness, or by polishing the strut to reduce radiation losses.

Reflector potential is supplied through the lead wire 29, which connects at its upper end with cup 34, and extends downwardly through the length of the device within insulating ceramic sleeve 30 and out of the base through lead 31. An acceleration voltage to be applied between the cathode emitter surface 67 and entrance grid 10, heater voltages to be applied to filament leads 32 33, and power to a getter 77 all may be introduced through the base of the tube in a similar manner. With the entrance grid 10 and the associated metal structure supplied with positive accelerating voltage relative to the cathode emitter surface 67, the metallic resonator system including the grids 10 and 14 serves as an anode, attracting the electrons issuing from the cathode.

Prior methods of tuning reflex tubes generally change the distance from the entrance grid to the reflector by the amount that the distance between the entrance grid and exit grid is changed, the distance from the exit grid to the reflector remaining constant. Since the frequency is also changed by the motion of the grids, the net effect is to change the number of cycles of transit time of the electrons in making their round trip excursion. Theory and experiment show that such a change causes the power output of such a device, when used as an oscillator, to have a maximum value at one frequency, and to fall off at a rapid rate on either side of that frequency. A substantially constant output over a considerable range of frequencies may be obtained by the utilization of tuning means which effectively keeps constant the number of cycles of transit time of the electrons in making their round trip, as by moving the cathode, entrance grid, and reflector electrode as a unit relative to the exit grid. As seen from Fig. 1, this result has been accomplished in the present device by fixing the positions of all elements except the exit grid, thereby simplifying the tuning action.

Figures 6, 7, 8, 9, 10:
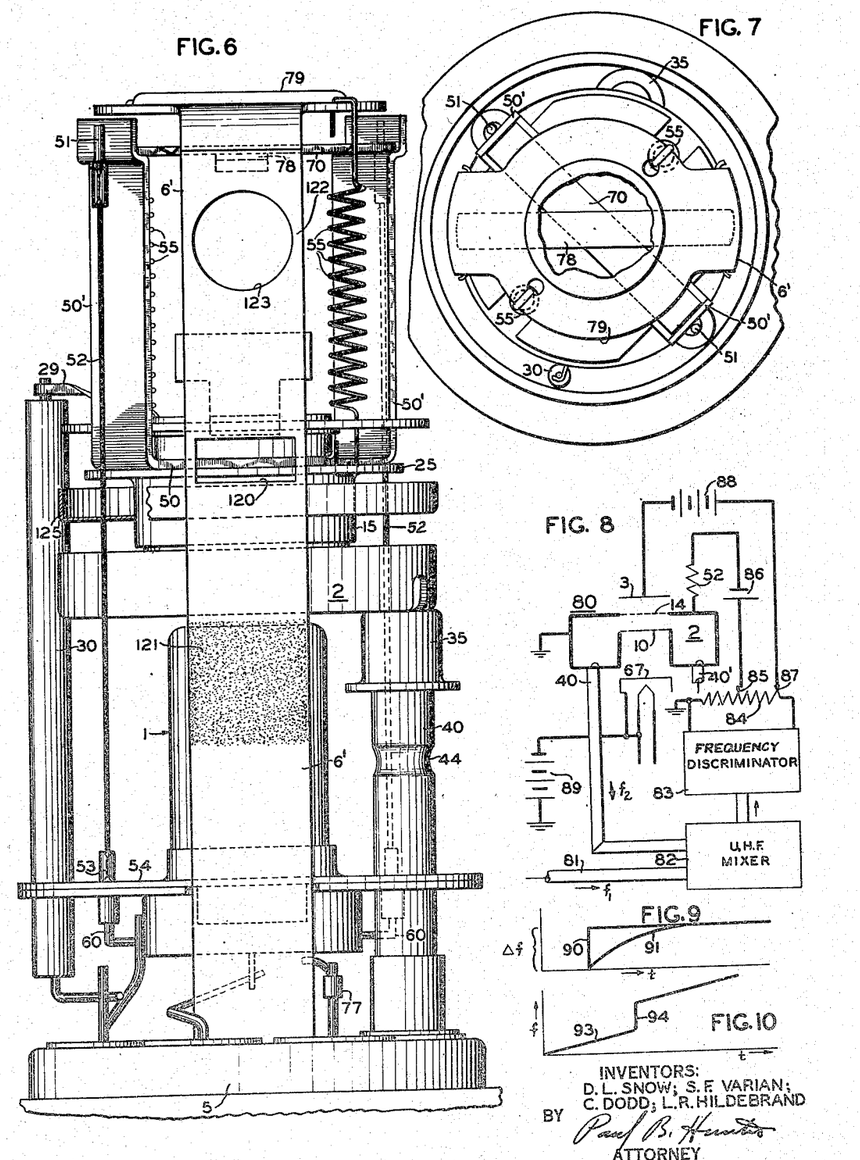
Fig. 6 is an elevation view of an alternate form of the invention.
Fig. 7 is a top view of the device shown in Fig. 6, on a somewhat reduced scale.
Fig. 8 is a schematic wiring diagram, showing one form of automatic control for the tuning device.
Figs. 9 and 10 are explanatory graphs.

The upper sections of the arms 6' separate the resonator 2 from the supported end of the tuning device and hence serve as rigid spacing means. Changes in the length of strut 21 deform the flexible diaphragm 12 and accordingly vary the resonator frequency, though it will be apparent that similar variations in frequency may be produced by undesirable changes in the length of the upper sections of the arms 6', occasioned for example by thermal expansion. Therefore, to minimize frequency-drift from thermal effects, means may be provided to inhibit the flow of heat from the principal source (within the resonator) to the spacing means. While it is possible to use arms 6' having a low coefficient of thermal expansion, this procedure is not as satisfactory as restricting the heat flow to the arms. One such method comprises thermally insulating the spacing means as by interposing a portion of relatively low thermal conductivity material in the path of heat flow. Reducing the cross-sectional area at points along the upper portions of the arms 6', as by forming apertures 120, is effective, especially when such apertures are located adjacent to the point of attachment of the resonator, as shown in Fig. 2. The lower sections of arms 6' are left intact, and accordingly conduct heat from the connecting point at a greater rate and have a greater heat capacity and higher dissipating rate than the upper sections, and hence they stabilize the temperature of the upper sections by diverting heat from them. If desired, the normal heat-dissipating capacity of the lower sections of arms 6' may be increased by providing radiators 124, such as fins or dull black portions, as shown in Fig. 6, thereby increasing the heat-diverting effect.

It may be desirable to adjust the normal frequency of each resonator at the factory to compensate for manufacturing errors and thereby preset all resonators relative to a fixed standard, or to adjust the frequency range to special requirements. Even though the present tube is formed generally of interchangeable parts, and the resonators and other parts are assembled with jigs and other precision devices, successively assembled tubes may differ appreciably in frequency, principally because of the small critical spacing between grids 10 and 14, and residual stresses introduced by the welding operations during assembly, especially during the final-stage step of securing lead 26 to the strut 21. One procedure for presetting the resonator frequency comprises deforming the spacing means, represented in the presently disclosed embodiment of the sections of arms 6' above the resonator 2. To render this procedure more practicable, the spacing means may include a readily deformable section, preferably at least one pair of generally longitudinally extending strips 122 that are permanently displaceable laterally relative to one another to alter the effective length of the arm 6' or similar spacing means. Such strips 122 may be produced in a simple manner by forming a relatively large aperture 123 centrally in the arms 6' as shown in Figs. 1, 2, and 6.

The action of the strips depends in some measure upon the shape of the aperture 123. For example, if a generally rectangular aperture is formed with its sides parallel to the sides of arm 6', the resulting strips 122 are straight parallel strips extending along the arm, and any transverse distortion of the strips shortens the arms so that frequency correction is unilateral in effect. On the other hand, if the aperture is of such shape as to produce arcuate or angulated strips, the arm may be lengthened or shortened by deforming the strips in either direction for bilateral frequency correction. An aperture 123 of circular shape is useful because squeezing the bowed strips together extends the arms 6' during initial movement, and shortens the arms 6' after a dead center position of the strips 122 is reached. Alternatively, the arms 6' may be shortened by an initial separating movement of the bowed strips 122. Since the strips in any case preferably extend originally in a direction generally along the arms, very accurate adjustment of the initial tuning may be made, because relatively minute movements along the arm may be made with substantially greater transverse distortion of the strips. Although it is desirable to adjust both arms 6' simultaneously in the initial frequency-setting operation, minor frequency adjustments may be made with even greater precision by adjustment of one arm only, provided that the symmetry of the parts is not altered.

Figure 3:
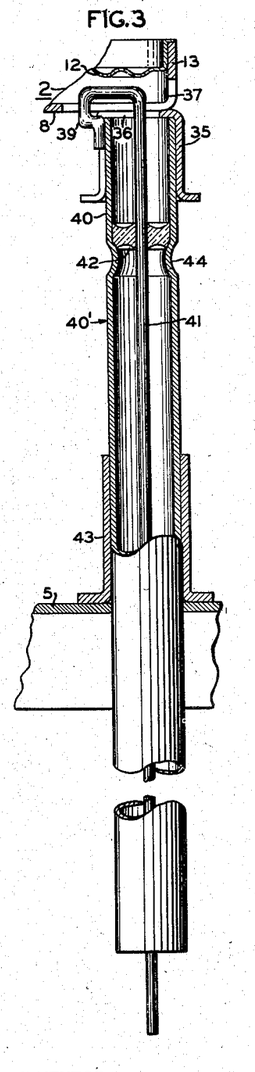
Fig. 3 is a partial cross-section view of a detail of Figs. 1 and 2.
Figure 4:
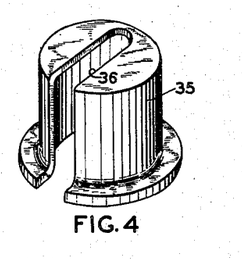
Fig. 4 is a perspective view of a portion of Fig. 3.

For removal of ultra high frequency energy from the resonator 2, a loop and coaxial line structure 40' shown in detail in Figs. 3 and 4 is provided. A slot 37 is punched or milled radially in one side of the resonator wall 8. Spot welded over the slot 37 near the outer diameter of the wall 8 is a flanged locating ferrule 35 which, as shown in Fig. 4, contains slot 36 that extends across its upper flat surface and down one side of a cylindrical wall. This slot 36 is made to match the position of the slot 37 and both are of sufficient width to allow a coupling loop 39 to extend into the resonator 2 without touching the sides of slots 36 or 37. The loop 39 has its outer end spot welded to outer conducter 40 fitting within the flanged ferrule 35. The loop 39 is continued to form the inner conducting element 41 of the coaxial line 40'. In order to provide continuity of the vacuum envelope and to centrally locate the inner conductor 41, a glass-to-metal seal 42 is provided. Since heating and pressure occur in spot welding the outer end of loop 39 to the tube 40, it is desirable to place the glass-to-metal seal 42 at some distance from the end of tube 40. This is accomplished in the following manner.

A neck or constriction 44 is rolled or otherwise formed in the wall of the tube 40, and a bead of glass 42 of diameter nearly equal to the inner diameter of the tube 40 is then applied and fused to a straight inner conductor 41. Conductor 41 with its attached glass bead 42 is inserted into the tube 40, the bead being stopped at a short distance from the top of tube 40 by the inwardly projecting constriction 44. The glass to metal seal between bead 42 and the inner constricted wall of tube 40 is then made by applying heat to the exterior of tube 40. Loop 39 is then bent into shape and its outer end is spot welded into position. Thus, the position of loop 39 and of coaxial line 40' is determined by the base 5 and ferrule 35. Coaxial line 40' extends through the base 5 being reinforced and sealed relative thereto by collar 43 as shown in Figs. 1 and 3, the diameter of resonator 2 being thus determined by the conventional diameter of the pin circle of base 5. Thus, the lower end of the coaxial line 40' extends through the tube base 5 as an externally accessible protuberance thereof providing for making all connections through generally similar terminal units at the bottom of the tube, for maximum ease in insertion and removal and replacement of tubes of this type. If desired, a second, or more coupling loops and coaxial leads may be provided in the same manner. By locating the glass bead 42 at a point remote from the lower end of the coaxial line 40', the tube may be exhausted more easily, and the bead is less likely to be damaged by manipulation of the conductor 41, because of the greater resiliency of the conductor, and the useful tube life thereby is enhanced.

The structure described not only incorporates improved structural features but also has been particularly designed for fabrication by modern mass production methods. The base 5 is first prepared with its associated Kovar eyelets 76 and the yoke 6 is spot welded into place. The yoke 6 acts as a jig, into which the completed sub-assemblies, such as electron gun 1, resonator 2, reflector 3, and the thermal tuning elements are slid in tandem relation, as shown in the drawings. Proper separations of these components may be obtained by simple spaced jigs, or cooperative positioning means such as openings or inwardly projecting lugs 5' may be provided to maintain the components in position during spot welding of the parts to the yoke 6. The assembled structure is extremely rigid and is highly adapted to spot welded fabrication. It is evident that the relation of the components in the tube may be inverted, so that the thermal tuning strut projects upwardly from the base 5 of the tube, if additional rigidity of that member is required.

In the device of Figs. 1 and 2, the tuning strut 21 is used in compression as well as tension, and hence requires a relatively large cross-section to develop sufficient rigidity. Hence a relatively large amount of power and appreciable time is required to expand the tube. The device of Fig. 6 discloses an alternative form of the present invention in which a quicker acting lower power thermal means is provided for tuning the resonator 2. The cathode-accelerator assembly 1, the resonator 2, and the coaxial line structure and their mountings and voltage lead-in members may be similar to those shown in Fig. 1, and are therefore given corresponding reference numbers. Tubule 15, fastened to the inner portion of flexible diaphragm 12 has spot welded on its upper flanged surface 25 a support 50 having two arms 50' extending nearly even with the top of the arms 6' of yoke 6 but which are independent thereof. The upper ends of the arms 50' are offset to receive a brace 70, and to provide upper terminals for two small diameter thermally expansible filaments such as tuning wires 52, which may be of 4 mil tungsten wire or the like, and are fixed to brace 70 at 51. Both wires extend downwardly the length of the tube and are secured near the base 5 of the tube at 53 in an insulating disc 54 rigid with base 5. Brace 70 is centered by a flat spring leaf 78 whose ends are spot welded to the inner surfaces of arms 6', brace 70 and spring 78 being spot welded together at a slight angle, as seen in Fig. 7. Spaced at 90° from the oppositely positioned wires 52 are two coiled tension springs 55, which may be of tungsten and which extend parallel to the arms 50' and which are attached to the bottom portion of the yoke 50. The upper ends of springs 55 are attached to a top plate 79 which is spot welded to and connects the upper ends of the arms 6'. Thus springs 55 pull the grid carrying diaphragm 12 toward the top 79 so that the thermal expansion wires 52 are kept taut. The wires 52 are symmetrically disposed relative to the median line running longitudinally of the tube and accordingly urge the grids to move along parallel planes. However, additional means such as a second diaphragm 125 or its equivalent may be used above the diaphragm 12 to maintain the parts in parallelism. If the filaments 52 are made sufficiently rigid, e. g., like the central strut 21, the springs 55 may be omitted.

The wires 52 may be energized in parallel by connecting a power source between yoke 6 and leads 60 extending to the tube base. Exterior electronic or other control means may actuate the power source and hence determine the distance between the grids 10 and 14 and consequently determine the output frequency of the device. Tests indicate that it is possible to obtain 0.005 inch expansion of the wires, or a tuning range of approximately 500 megacycles at wavelengths of the order of ten centimeters, it not being necessary to raise the temperature of the wire above 900° C. to obtain this result. It is evident that the two tuning wires and springs may be replaced by a greater or lesser number of like elements.

The use of wires or thermal strut tuning means also allows the operating frequency range of the device to be preset at an arbitrarily chosen range. This method may, for example, comprise elevating the temperature of the thermal wire or strut somewhat above the temperature at which permanent stretching of the tuning member begins to occur, e. g. to the plastic range. During this process, the reflex device is operated in the conventional manner as an oscillator, its output being fed into a high Q wavemeter adjusted for the desired output range. The current through the tuning element is continually raised, stretching the wire by springs 55 or other means, until resonance in the wavemeter occurs. At a predetermined point past resonance, the current through the thermal element is manually or automatically cut off and the wires thereby given a permanent set in their elongated condition. Thus the frequency range through which the device operates is determined by the amount of preliminary stretching of the thermal element.

Figure 11:
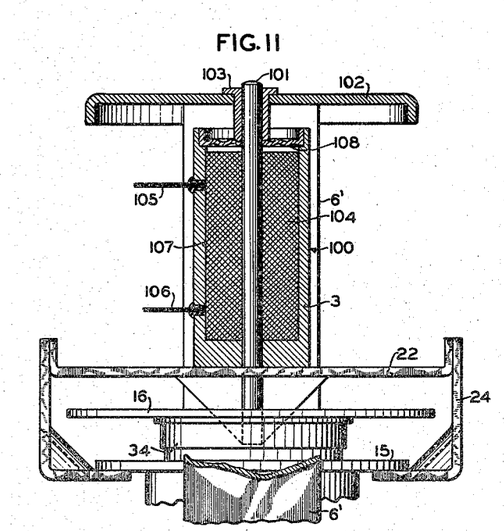
Figs. 11 and 12 are partial cross-sectional views of modified types of electro-mechanical tuners.
Figure 12:
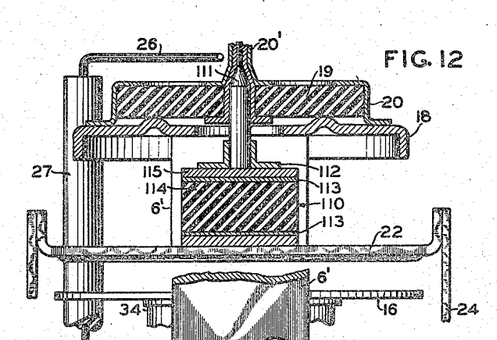

Figs. 11 and 12 disclose other forms of electro-mechanical tuners that produce mechanical movement, e. g., expansion or contraction, in response to electrical excitation. In the construction shown in Fig. 11, use is made of a magneto-strictive device 100 which may be substituted for the thermally expansible tube 21 or wires 52, and which device comprises a tubular rod or strut 101 having a coefficient of magneto-strictive expansion that maintains the same sign throughout the range of magnetic excitation. Nickel has a positive coefficient at all times and accordingly is useful for the purpose, as is Heussler alloy, but iron and cobalt are unsuitable because their coefficients change sign with variation in the flux density. The rod 101, which is fixed to a top plate 102 by means of a centralizing bushing 103, extends downwardly for connection of its free end with the resonator through gusseted bracket 22, member 24, and tubule 15. The rod 101 is excited in any conventional manner, as by a magnetizing coil 104 having terminals 105 and 106. The magnetic path is completed through a ferromagnetic flexible diaphragm 108 and a ferromagnetic casing 107 secured to the bracket 22. The device operates in the manner of the previously described forms of the invention in that electrical excitation varies the length of the tuning element 101 and accordingly changes the shape and natural frequency of the resonator. If the rod 101 is made of nickel, increasing the field strength shortens the rod, thus separating the electrodes and increasing the resonator frequency. The advantage of the magneto-strictive tuner over the thermal tuner lies principally in its quicker response to the control impulse, and in its lower power consumption.

As shown in Fig. 12, use may be made of a piezo-electric tuner 110 having a central rod or strut 111 located on the axis of symmetry of the resonator, especially with regard to the relatively movable frequency-controlling electrodes or grids thereof. The upper end of strut 111 may be supported on and insulated from a cover plate 18 in the manner shown in Figs. 1 and 2. The lower end is secured to a contact plate 112 which cooperates with the upper surface of bracket 22 to excite a block or crystal of piezo-electric material 114 such as quartz, tourmaline, or Rochelle salts. Any of these materials may be prepared for the purpose by coating opposite sides with a thin tinning layer 113, such as copper, in any manner, as by sputtering or distilling, to which layers electrode discs 115 may be soldered or otherwise secured. To minimize frequency drift from thermal effects, the piezo-electric material preferably is one having a negligible temperature coefficient. By applying a relatively large potential across the crystal 114, through lead 26 and bracket 22, the dimensions of the crystal are altered and motion is imparted through members 22 and 24 to the resonator so as to effect a tuning action. The piezo-electric tuner is more immediate in its response to the control impulse than the thermal tuner, and drains no current from the control circuit.

As is well known in the art, modulation of the output frequency of reflex ultra high frequency generators can be obtained by variation of the potential applied to the reflector electrode as any useful function of time; also, in a similar manner, modulation can also be accomplished by varying the acceleration voltage applied to the cathode. In the latter instance, the modulation source must be able to supply power to the system. Modulation of the output frequency may also be obtained by variation of the power to the thermal element in any desired manner. It is therefore evident that control of the output frequency of the device may be made through simultaneous control of the voltages applied to the cathode, reflector, and electro-mechanical tuning elements, or through any simultaneous combination of these means.

Figure 13:
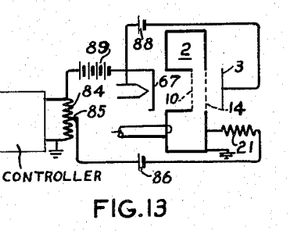
Fig. 13 is a schematic wiring diagram, similar to Fig. 8 showing another form of dual control.
Figure 14:
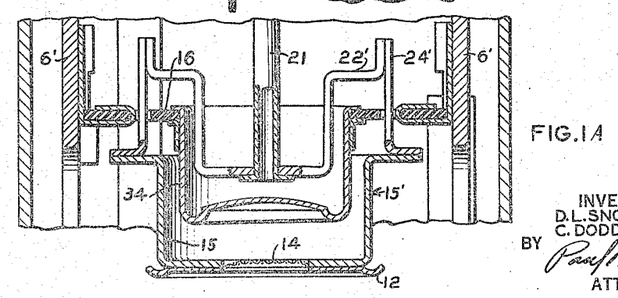

In actual practice, it is found that sudden small frequency variations may be controlled readily by variation of the reflector electrode voltage, and that the larger, long time frequency changes are better compensated for by use of a conjointly acting electro-mechanical tuning device, as shown in Figs. 8 and 13.

Both figures disclose automatic frequency control systems wherein the advantages of the immediately responsive electrical control and the slower-acting but longer range electro-mechanical tuning control are combined in a single circuit. In Fig. 8 both controls act conjointly to increase the resonator frequency with a rise in control voltage brought about by an increase in the frequency of a control signal relative to the resonator frequency. By varying the potential applied to one or more frequency-controlling electrodes, instantaneous response is exercised; by electro-mechanically acting on the resonator, the tuning range is effectively increased over that obtainable with electrical control alone. A similar dual control system is shown in Fig. 13, except that it acts inversely—that is, an increase in the control voltage electro-mechanically distorts the resonator body and also modifies the potential on a frequency-controlling electrode therein to decrease the natural frequency. The control voltage for either or both types of tuners may be regulated manually or automatically, according to individual requirements.

In Fig. 8 a reflex velocity modulation tube 80 with cathode 67, resonator 2, and reflector electrode 3 is shown in use, for example, as the local oscillator in a receiver, in which it is desired to match the output frequency of tube 80 to a signal $f_1$ appearing in coaxial line 81. The signal $f_1$ and the output signal $f_2$ of tube 80 are introduced into a conventional ultra high frequency mixer 82 via coaxial leads 40 and 81, and the output of mixer 82 is then introduced into a conventional frequency discriminator 83. The variable magnitude, reversing polarity direct current output of discriminator 83 appears across tapped potentiometer 84. Adjustable tap 85 supplies a proper control voltage through bias battery 86 to filament 52 (or nickel strut 101); likewise, adjustable tap 87 supplies a correction voltage through battery 88 to reflector 3. Battery 88 acts as a bias battery to allow the reflector 3 to operate at or near the potential of cathode 67. An acceleration voltage is applied between cathode 67 and entrance grid 10 in the usual manner from a battery 89. An increase in the voltage across potentiometer 84 separates the electrodes 10 and 14, and at the same time increases the reflector potential, both of which tend to increase the operating frequency of the resonator 2.

Fig. 13 discloses a similar arrangement of parts wherein a control voltage simultaneously regulates an electro-mechanical tuner 21 and the potential on a control electrode. In the present instance, however, the control voltage across resistor 84 varies the cathode biasing potential rather than the reflector voltage, and actuates an electro-mechanical tuner of the type shown in Figs. 1 and 2. Accordingly an increase in control voltage increases the beam accelerating potential and decreases the spacing between grids 10 and 14, both of which operate to decrease the frequency of resonator 2. Any suitable controller may be used.

Thus, in operation, as shown in the graph of Fig. 9, if it is desired to increase the frequency by an increment $\Delta f$, this change may be made by a combination of a sudden change, as along path 90, by means of control of the reflector voltage, or by a more gradual change, as along the path 91, by control of the thermal strut. In Fig. 10, a gradual electro-mechanical change, shown by the slope of line 93, is shown suddenly broken by an instantaneous electrical change, as at 94. It is thus evident that long time frequency drifts, as caused by ambient temperature drift or by gradual changes in power supply voltages, as well as suddent output frequency changes, as caused by sudden changes of power supply voltages, may be corrected for by the combined use of electrode voltage control and electro-mechanical tuning.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A cavity resonator device comprising means for producing an electron beam, a pair of adjustably spaced electron-permeable beam entrance and exit wall portions disposed in the path of said beam, means in said beam path for returning the beam through said exit wall portion, and tuning means disposed substantially symmetrically about the axis of said beam for varying the spacing of said wall portions, said tuning means comprising a thermally extensible member and a lead-in conductor connected thereto and adapted to be coupled to a source of potential supplying heating current to said member for controlling its extension.

2. A reflex type velocity modulation tube comprising an evacuated envelope having disposed therein an electron emitter means for producing a beam of electrons, means defining a hollow resonator having electron permeable wall portions aligned with said beam, entrance and exit grids in said wall portions, and a flexible diaphragm forming one wall portion of said resonator and supporting said exit grid for movement toward and from said entrance grid, an electron-reflecting electrode mounted in the path of said beam and spaced from said resonator on the side of said resonator opposite said emitter means, electro-mechanical tuning means comprising a substantially centrally located strut of variable length fixed at one end and disposed along the axis of said beam, and connecting means extending around said reflecting electrode from the free end of said strut to said diaphragm.

3. A reflex type velocity modulation tube comprising an evacuated envelope having disposed therein electron emitter means for producing a beam of electrons, means defining a hollow resonator having wall portions formed with beam entrance and exit grids, a flexible diaphragm forming one wall portion of said resonator and supporting said exit grid for movement toward and from said entrance grid, an electron-reflecting electrode mounted in the path of said beam and spaced from said resonator on the side of said resonator opposite said emitter means, electro-mechanical tuning means comprising a substantially centrally located strut of variable length fixed at one end and disposed along the axis of said beam, and connecting means between said strut and diaphragm comprising a cup-shaped member surrounding said reflecting electrode and secured at one end to an inner annular zone of said diaphragm.

4. High frequency apparatus comprising an evacuated envelope, a cavity resonator within said envelope and having substantially parallel mutually adjoining electron-permeable wall portions, and a tuning device for varying the spacing of said wall portions, said tuning device comprising electrically expansible elongated means within said envelope, said means being fixed at one end relative to said envelope and having the opposite end connected to one of said wall portions, and being symmetrically disposed relative to and extending in the direction of a median line perpendicular to said one wall portion.

5. High frequency apparatus comprising an evacuated envelope, a cavity resonator within said envelope and having mutually adjoining electrodes mounted in spaced walls of said resonator, and a tuning device for varying the spacing of said electrodes, said tuning device comprising an electrically-responsive expansible and contractible strut within said envelope, a support for one end of said strut fixed to said envelope, and connecting means joining the opposite end of said strut with one of said electrodes.

6. A velocity-modulation-tube tuning device for varying the position of a movably mounted wall portion of a cavity resonator located within an evacuated envelope, said tuning device comprising an electrically-responsive expansible and contractible strut within said envelope, a fixed support for one end of said strut, and connecting means joining the opposite end of said strut with said wall portion, said strut comprising a block of piezo-electric material disposed between the ends of said strut and having terminals for applying an electrical potential across said block.

7. A velocity-modulation-tube comprising an evacuated envelope having disposed therein an electron emitter for producing an electron beam, a cavity resonator having electron beam entrance and exit grids, a flexible diaphragm forming one wall of said resonator and supporting said exit grid for relative movement toward and from said entrance grid, a fixed electron-reflecting electrode disposed opposite said exit grid in the path of said beam, and electro-mechanical tuning means attached to said exit grid, said tuning means being adapted to move said exit grid on the one hand perpendicularly toward and from said entrance grid and said electron-reflecting electrode on the other hand.

8. High frequency tube structure comprising an envelope, support means within and rigid with said envelope, a hollow resonator mounted on said support means and having a movable wall portion, a cathode carried by said support means for projecting a beam of electrons through said resonator, an electron reflector electrode mounted on said support means in the path of said beam beyond the resonator, said support means having a terminal section adjacent the end of said envelope opposite said cathode, and electrically responsive tuning means reacting between said terminal section and said movable wall portion for tuning said resonator.

9. The tube structure defined in claim 8, wherein said tuning means comprises a rigid expansible and contractible strut anchored at one end on said terminal section and connected at its other end to said wall portion.

10. The tube structure defined in claim 8, wherein said tuning means comprises a thermally responsive wire connected at opposite ends to said support means and said movable wall portion, and resilient means between said terminal section and said movable wall portion for biasing said wire.

11. High frequency tube structure comprising an envelope, support means within and rigid with said envelope, a hollow resonator carried by said support means intermediate the ends of the latter, a movable wall portion on said resonator, connecting means upstanding from said movable wall portion, an elongated thermal tuning wire extending substantially between one end of said support means and the free end of said connecting means, and a spring interconnecting the other end of said support means to said movable wall portion, said spring being biased to maintain said wire under tension.

12. A tuning device for a cavity resonator comprising a plurality of filamentary tuning elements substantially symmetrically disposed about the axis of said resonator and being electrically expansible to permit distortion of said resonator to alter its natural frequency, and substantially symmetrically disposed spring means biased to maintain said element taut.

13. High frequency tube structure comprising an envelope, a support within and rigid with said envelope, a hollow resonator mounted on said support, a flexible wall on said resonator formed with an aperture, a cup-shaped member secured to said flexible wall about said aperture, an electron reflector electrode aligned with said aperture and extending within said cup-shaped member, an insulator plate by which said electrode is mounted on said support, and a resonator tuning control element secured to said member.

14. High frequency tube structure comprising an envelope, means defining a hollow resonator within said envelope, relatively movable wall portions on said resonator, one of said wall portions being flexible, means in said envelope for projecting an electron beam through said resonator, and a relatively rigid tuning member within said envelope having spaced parts operably connected to said wall portions, motion-transmitting means being provided between said tuning member and said flexible end wall, said member having a section shiftable in response to varying degrees of electrical energization thereof for controlling relative movement between said wall portions and determining the natural frequency of said resonator.

15. The tube structure defined in claim 14, wherein said tuning member is a thermally responsive strut operatively connected at opposite ends to said wall portions.

16. High frequency tube structure comprising means defining a hollow resonator having a movable wall portion formed with an apertured section, an expansible and contractible substantially rigid tuning strut anchored at one end in said structure, motion transmitting means connecting the other end of said strut to said section and a lead-in conductor coupled to one end of said strut for supplying current thereto to control the length thereof for tuning said resonator.

17. The tube structure defined in claim 16, wherein said motion transmitting means comprises an annular member secured to said movable wall about said aperture.

18. High frequency apparatus comprising a cavity resonator, cathode means adjacent said resonator for projecting a beam of electrons through said resonator, means coupled to said cathode means for applying a beam acceleration voltage to said cathode means, tuning means for said resonator comprising means for controlling the potential of said cathode, and further tuning means for said resonator comprising thermally responsive means coupled to said resonator adapted to alter the physical characteristics of said resonator.

19. The apparatus defined in claim 18, including means in said apparatus rendering both said tuning means responsive to departures of the resonator frequency from a predetermined value.

20. Ultra high frequency apparatus comprising a cavity resonator, electrically energizable means in said apparatus coupled to said resonator and adapted to alter the physical characteristics of said resonator for tuning said resonator, and means in said apparatus for controllably varying the energization of said electrically energized tuning means in accordance with modulating signals for modulating the output of said resonator by said signals.

21. The apparatus defined in claim 20 wherein said electrically energized means comprises thermally responsive means.

22. High frequency tube structure comprising a cavity resonator having a movable wall portion, a tuning element having a shiftable part connected to said wall portion, spacer means interconnecting said resonator and said tuning element, said spacer means having adjustable length enabling preliminary adjustment for relatively displacing said resonator and tuning element for presetting the resonator tuning control action of said tuning element.

23. High frequency tube structure comprising a cavity resonator having a movable wall portion, a tuning element having a shiftable part connected to said wall portion, spacer means interconnecting said resonator and said tuning element, and means in said spacer means enabling preliminary adjustment for relatively displacing said resonator and tuning element for presetting the resonator tuning control action of said tuning element, said spacer means comprising a common support for said resonator and tuning element, and said last-named means comprising a weakened section of said support deformable for regulating said spacing.

24. High frequency tube structure comprising a cavity resonator having a movable wall portion, a tuning element having a shiftable part connected to said wall portion, spacer means interconnecting said resonator and said tuning element, and means in said spacer means enabling preliminary adjustment for relatively displacing said resonator and tuning element for presetting the resonator tuning control action of said tuning element, said spacer means comprising an arm extending between said resonator and said tuning element, and having an apertured region in said arm intermediate its ends rendering said arm deformable for regulating said spacing.

25. A high frequency tube structure comprising a cavity resonator, a tuning element, spacing means attached to said resonator and to said tuning element, said tuning element having a portion connected to said resonator and movable toward and from said resonator to alter the natural frequency of said resonator, and temperature-stabilizing means for inhibiting frequency drift caused by thermal expansion of said spacing means as a result of heat flow from said resonator to said spacing means, said stabilizing means comprising a portion of reduced cross-sectional area formed in said spacing means.

26. In a method of presetting the frequency range of a cavity resonator tunable by variation in length of a tuning element connected to a movable portion of said resonator, the steps of heating said tuning element until it becomes permanently yieldable, moving said movable portion of said resonator until the resonator attains a predetermined frequency, said movement producing elongation of said element, and maintaining said movable portion of the resonator fixed while permitting cooling of said tuning element, so that said element becomes permanently set in elongated condition.

27. A high frequency tube structure comprising a generally cylindrical cavity resonator, means aligned with said resonator for projecting a beam of electrons into cooperative relation with said resonator, a plurality of filamentary tuning elements symmetrically disposed about and extending in the direction of the axis of said resonator and being responsive in their length to temperature changes in said elements for distorting said resonator axially to alter its natural frequency, and symmetrically disposed spring means opposing said tuning elements in the direction of said axis.

28. A high frequency tube structure comprising an evacuated envelope enclosing a support having a pair of substantially parallel arms extending substantially the length of said envelope; and a cathode, a cavity resonator, and electromechanical resonator tuning means individually connected to said resonator, said cathode, resonator and tuning means being all operatively aligned in tandem relation within and supported by said arms of said support.

29. High frequency apparatus comprising a base, an envelope vacuum-sealed to said base, a frame rigid with said base and extending within said envelope, means supporting cathode, hollow resonator and reflector assemblies in alignment on said frame adjacent one end of said envelope, an electrically responsive frequency-control member rigidly secured to said frame adjacent the other end of said envelope, and means operatively connecting said frequency-control member to said resonator.

30. High frequency apparatus comprising a base, an envelope vacuum-sealed to said base, a frame mounted on said base and extending within said envelope, cathode, hollow resonator and reflector assemblies, means maintaining said assemblies in alignment on said frame, an electrically responsive frequency-control member secured to said frame, and means operatively connecting said frequency-control member to said resonator.

31. High frequency apparatus comprising a hollow resonator having a movable portion for varying the frequency of said resonator, a plurality of non-rigid wires extending between said portion and a relatively fixed part of said apparatus, and means maintaining said wires under tension.

32. An ultra high frequency electric discharge device of the velocity modulation type comprising an hermetically sealed envelope including a cylindrical wall closed at one end, a base member transverse to said wall supporting and closing said wall at the other end thereof, an annular anode structure within said envelope having spaced walls extending transversely to said cylindrical wall and defining in part a cavity resonator, aligned apertures in said spaced walls, a cathode constituting a source of electrons to be passed through said resonator and said apertures positioned on one side of said anode structure in alignment with said apertures, electrode means adapted to return electrons to said resonator in alignment with said apertures and positioned on the other side of said anode structure, conductor means connected to said electrode means for impressing potentials thereupon and electrically insulated from said anode structure, said conductor means being connected to externally accessible terminal means supported by said base member, and a concentric transmission line coupled to said resonator and terminated in an externally accessible protuberance constituting a part of said base.

33. An ultra high frequency electric discharge device of the velocity modulation type comprising an hermetically sealed envelope including a cylindrical wall closed at one end, a base member transverse to said wall supporting and closing said wall at the other end thereof, an annular anode structure within said envelope and having spaced walls extending transversely to said cylindrical wall and defining in part a cavity resonator, aligned apertures in said spaced walls, a cathode positioned on one side of said anode structure in alignment with said apertures, said cathode constituting a source of electrons to be passed through said resonator and said apertures, electrical means adapted to return electrons to said resonator in alignment with said apertures and positioned on the other side of said anode structure, conductor means connected to said electrode means for impressing potentials thereupon and electrically insulated from said anode structure, said conductor means being connected to externally accessible terminal means supported by said base member, and a concentric transmission line coupled to said resonator and terminated in an externally accessible protuberance constituting a part of said base.

34. An ultra high frequency electric discharge device of the velocity modulation type comprising an hermetically sealed envelope including a cylindrical wall closed at one end, a base member transverse to said wall supporting and closing said wall at the other end thereof, an annular anode structure within said envelope and having spaced walls extending transversely to said cylindrical wall and defining in part a cavity resonator, aligned apertures in said spaced walls, a cathode positioned on one side of said anode structure in alignment with said apertures, a retarding and reflecting electrode in alignment with said apertures positioned on the other side of said anode structure, a plurality of conductors connected to said electrodes for impressing potentials thereupon, electrically insulated from said anode structure, said conductors being connected to externally accessible terminals supported by said base member, and a concentric transmission line coupled to said resonator and terminated in an externally accessible protuberance constituting a part of said base.

DONALD L. SNOW.
SIGURD F. VARIAN.
COLEMAN DODD.
LYNN R. HILDEBRAND.

REFERENCES CITED

The following references are of record in the file of this patent:

UNITED STATES PATENTS

| Number | Name | Date |
|---|---|---|
| 1,543,872 | Ruben | June 30, 1925 |
| 1,545,247 | Gargon | July 7, 1925 |
| 1,559,714 | Lilienfeld | Nov. 3, 1925 |
| 1,857,193 | Hopp | May 10, 1932 |
| 1,930,524 | Laport | Oct. 17, 1933 |
| 2,095,981 | Hansell | Oct. 19, 1937 |
| 2,128,232 | Dallenbach | Aug. 30, 1938 |
| 2,170,219 | Seiler | Aug. 22, 1939 |
| 2,190,511 | Cage | Feb. 13, 1940 |
| 2,216,170 | George | Oct. 1, 1940 |
| 2,242,275 | Varian | May 20, 1941 |
| 2,245,627 | Varian | June 17, 1941 |
| 2,259,690 | Hansen et al. | Oct. 21, 1941 |
| 2,287,845 | Varian et al. | June 30, 1942 |
| 2,298,949 | Litton | Oct. 13, 1942 |
| 2,304,186 | Litton | Dec. 8, 1942 |
| 2,311,658 | Hansen et al. | Feb. 23, 1943 |
| 2,314,794 | Linder | Mar. 23, 1943 |
| 2,408,817 | Snow | Oct. 8, 1946 |
| 2,411,912 | Vance | Dec. 3, 1946 |
| 2,411,913 | Pierce et al. | Dec. 3, 1946 |
| 2,421,273 | Lafferty | May 27, 1947 |
| 2,438,132 | Snow | Mar. 23, 1948 |

FOREIGN PATENTS

| Number | Country | Date |
|---|---|---|
| 420,667 | Great Britain | Dec. 3, 1934 |
| 422,869 | Great Britain | Jan. 21, 1935 |
| 537,518 | Great Britain | June 25, 1941 |

Certificate of Correction

Patent No. 2,540,142                                    February 6, 1951

DONALD L. SNOW ET AL.

It is hereby certified that error appears in the printed specification of the above numbered patent requiring correction as follows:

Column 8, line 18, for the word "spaced" read *spacer*; column 17, lines 7 and 8, for "electrical" read *electrode*;

and that the said Letters Patent should be read as corrected above, so that the same may conform to the record of the case in the Patent Office.

Signed and sealed this 17th day of July, A. D. 1951.

[SEAL]

ERNEST F. KLINGE,
*Assistant Commissioner of Patents.*